Figure 1:
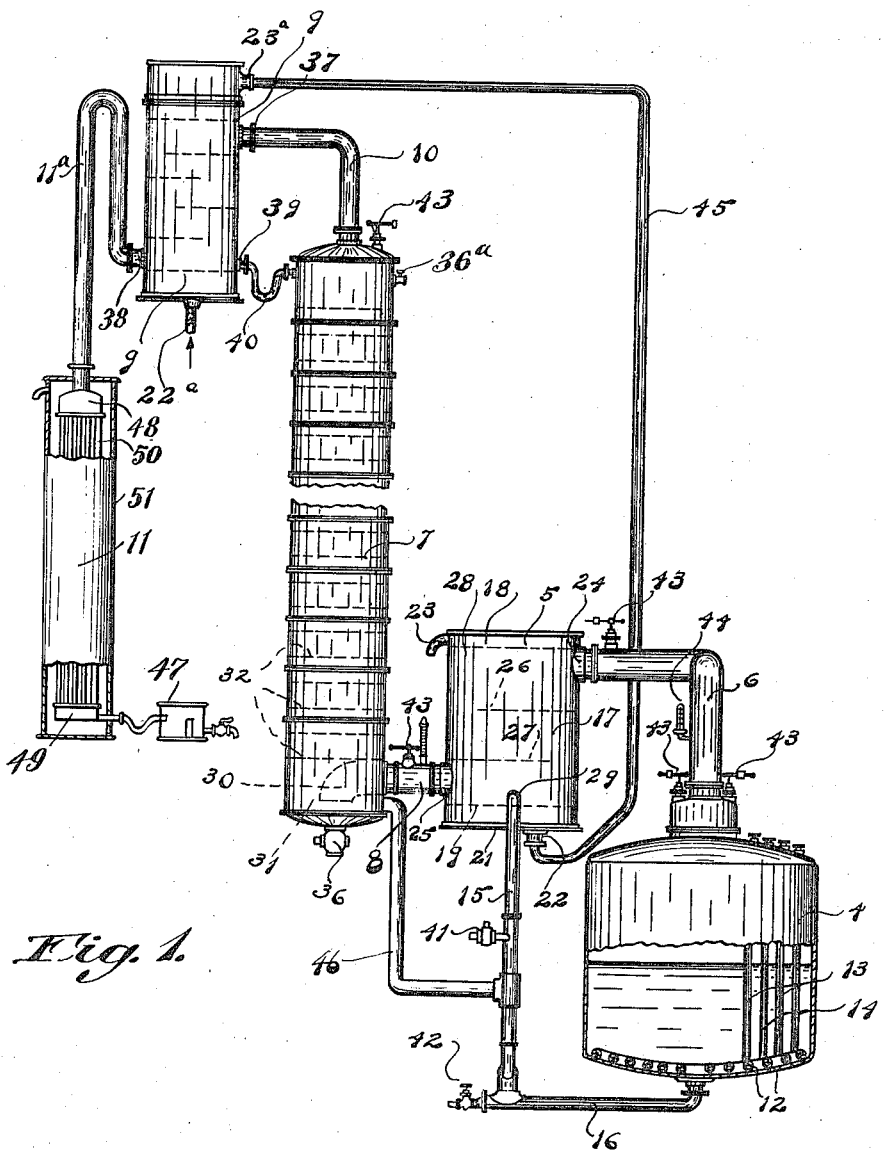

J. BUCHERT.
DISTILLING APPARATUS.
APPLICATION FILED JUNE 19, 1914.

1,169,122.

Patented Jan. 25, 1916.
2 SHEETS—SHEET 1.

WITNESSES

INVENTOR
Jacob Buchert
BY Walter F. Murray
ATTORNEY

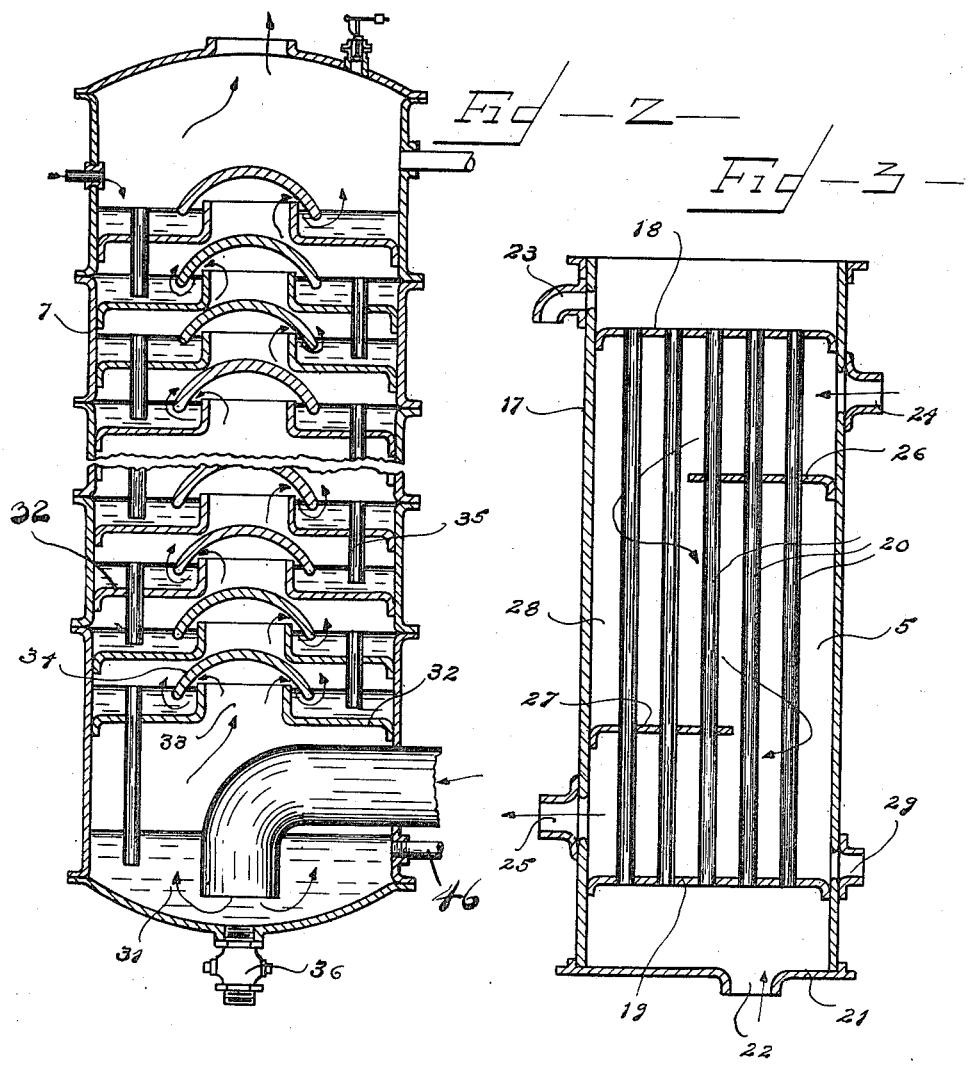

UNITED STATES PATENT OFFICE.

JACOB BUCHERT, OF NEWPORT, KENTUCKY.

DISTILLING APPARATUS.

1,169,122. Specification of Letters Patent. Patented Jan. 25, 1916.

Application filed June 19, 1914. Serial No. 846,064.

*To all whom it may concern:*

Be it known that I, JACOB BUCHERT, a citizen of the United States of America, and resident of Newport, Campbell county, State of Kentucky, have invented certain new and useful Improvements in Distilling Apparatus, of which the following is a specification.

This invention relates to improvements in distilling apparatus and processes and particularly that class of distilling apparatus which is used in producing high-proof ethyl alcohol or neutral spirit of wine.

An object of my invention is to produce a distilling apparatus and process in which high proof ethyl alcohol or neutral spirit may be produced more economically, in greater quantities and of a higher proof and greater purity than heretofore.

A further object is to produce a distilling apparatus and process in which complete separation of the contaminating constituents which are prevalent in the first distillate of the beer, which is known as commercial high wine, may be accomplished.

A further object is to produce an apparatus by means of which the higher and lower temperature vaporizing distillates may be separated and recovered from the ethyl alcohol, in one continuous distillation.

These and other objects are attained in the apparatus and process described in the following specification and illustrated in the accompanying drawings in which—

Figure 1 is a somewhat diagrammatic view of the apparatus embodying my invention with parts thereof broken away and other parts shown in section for convenience of illustration. Fig. 2 is a longitudinal sectional view of the column shown in Fig. 1, and with parts thereof broken away for convenience of illustration. Fig. 3 is a longitudinal sectional view of the separator between the column and the still illustrated in Fig. 1.

The apparatus illustrated comprises a kettle still 4, a fractional separator 5, connected with the kettle still by means of a pipe 6, a refining column 7 connected with the fractional separator by means of a pipe 8, and a final separator 9 connected with the column by means of pipe 10. The final separator is in turn connected with a condenser 11 by means of a pipe 11ª from which the high proof alcohol or spirits is run off into containers after having first passed through the tale box 47 connected with the condenser.

The kettle still is of ordinary construction and is provided with steam coils 12 having inlet and outlet pipes 13 and 14 respectively, the steam coils being provided for heating the contents of the kettle 4. The vapors which are driven off from the material contained in the kettle are conducted through the pipe 6 into the fractional separator 5 where a portion of the vapors is condensed and conducted back through a pipe 15, into the still 4 through a pipe 16 which is connected with the still and the pipe 15.

The fractional separator which is illustrated in section and upon a somewhat enlarged scale in Fig. 3, consists of a casing 17 in which headers 18 and 19 are mounted, these headers being connected with a number of pipes 20 which extend through the separator from one header to the other. At the bottom of the casing a head 21 is provided, which contains an opening 22 to which a suitable source of water supply is connected. The upper end of the casing is left open but is provided with an over-flow pipe 23 so as to permit the water passing upwardly through the pipes 20, to escape. A flanged opening 24 is provided near the top of the casing and communication with the chamber 28 formed between the two headers 18 and 19 is provided for the purpose of admitting vapors passing from the kettle still. An outlet 25 is provided in the casing adjacent to the header 19 for the vapors entering through opening 24. Baffle plates 26 and 27 are located within the chamber and upon opposite sides thereof for the purpose of creating a circuitous flow of the vapors through the chamber in order to cause them to pass across the tubes 20 several times before leaving the separator. Any of the vapors which may have become condensed because of their passage in contact with the tubes 20, fall to the bottom of the chamber 28 between the headers 18 and 19 and pass from the separator through the opening 29 and into the pipe 15, back to the kettle still where they are again vaporized. The reason for this redistillation of the vapors condensed within the fractional separator, will be hereinafter explained.

The uncondensed vapors which pass outwardly through the opening 25, enter the pipe 8 which communicates with the refining column 7. This pipe is provided with an elbow 30 which is turned downwardly so as to discharge the vapors passing therethrough into the water contained in the lower chamber 31 of the refining column. This column is provided with a number of drip pans 32 which are spaced apart throughout the length of the column. Each of these drip pans is provided with a central opening 33 through which the ascending vapors may pass. In order, however, to interrupt the flow of the vapors through the column, traps 34 are provided for the purpose of forcing the ascending vapors to enter the water bath contained upon each of the drip pans 32. Each of the drip pans is also provided with an overflow pipe 35 through which the excess of fluid accumulated in each drip pan may overflow and pass to the pan beneath.

The lower end of each pipe 35 is adapted to extend below the level of the liquid contained in each pan, for the purpose of preventing the ascending vapors from passing upwardly through the column without first passing through each water bath of the drip pans, sufficient water having been placed in the drip pans to fill them previous to starting the distilling operation, a valve 36ª being provided at the top of the column for this purpose. As the vapors of the less volatile contaminating constituents of the commercial high wine, are condensed and absorbed in their upward passage through the column, the fluid in the drip pans will increase and gradually flow from one pan to the other until a sufficient amount has accumulated in the bottom chamber 31 to flow through the return pipe 46 connecting the chamber 31 and pipe 15, to the kettle. I have provided a valve 36 for permitting the contents of the column to be cleaned out. All of the lighter vapors which have passed through the column without condensing, enter the final separator through a pipe 10. This separator is of similar construction to the fractional separator heretofore described and illustrated in detail in Fig. 3, it being provided with a vapor inlet and outlet, 37 and 38 respectively, and a water inlet and outlet 22ª and 23ª respectively. A pipe 45 connects the water outlet 23ª of the final separator and the water inlet of the fractional separator so that the temperature of both separators will be the same.

An outlet 39 is provided for any of the vapors which may have condensed in the final separator and a pipe 40 is provided for conducting these condensed vapors back into the column where they pass into each successive drip pan and finally into the bottom chamber 31. The vaporized products which pass the final separator without being condensed are passed into a condenser 11. The condenser is shown in Fig. 1 and is of ordinary construction, the vapor entering the top 48 and descending through the tubes 50 around which the water in the casing 51, passes to condense the vapors. The condensed vapors then drop into the bottom 49 and are run off into the tale box 47, where an alcoholometer is located for determining when the vapors of the different alcohols have been completely separated. From the tale box the alcohol is run off into condensers. The pipe 40 which conducts the condensed vapors from the final separator 9, is provided with a U-shaped bend which forms a trap for preventing any of the vapors passing from the column through pipe 40 and into a condenser 11, with little or no action of the final separator having been had.

An inlet 41 is provided in the pipe 15, through which fresh charges may be pumped into the kettle still 4. A blow off valve 42 is provided for permitting the contents of the kettle to be discharged after the distillation has been completed. Vacuum valves 43 are located at different points throughout the system for the purpose of preventing collapse of the apparatus when the kettle charge is blown off, which would be very liable to occur upon the cooling of the apparatus and the consequent decrease in pressure therein. I have also provided a thermometer 44 which is secured to the pipe 6 adjacent to the kettle, for indicating the temperature of the vapors passing through the pipe from the kettle, and in addition to this I have provided a thermometer 44 attached to the pipe 8 to indicate the temperature of the gases passing therethrough.

In operation:—A sufficient quantity of the first distillate from beer, which is commonly known as commercial low wine, is placed in the kettle still 4. Steam is now turned on in the coils 12 of the kettle still and when the vapors arising from the high wines in the kettle still have reached a temperature of 175 degrees Fahrenheit, as indicated by the thermometer 44 on the pipe 6 connecting the kettle still and the fractional separator 5, water is caused to pass through the pipes 20 of the fractional separator 5, this water being regulated to a temperature of 166 degrees Fahrenheit to hold the temperature of the first vapor to be separated, at 166 degrees when it has reached the opening 25 of the fractional separator, after having passed from the top where the temperature is 175 degrees. The temperature of the water and of the vapors is then regulated to remain at these points until the separation of the acetaldehyde and acetic ether vapors by the fractional separator, is complete, as ascertained by testing the vapors leaving the kettle still, for the presence of acetaldehyde and acetic ether vapors. After leaving the separator these vapors will pass into the vapor pipe 8, from which they are allowed to escape into the refining column 7. All vapors of materials which vaporize at a higher temperature than that of the water passing through the fractional separator, upon entering the separator will be condensed and will fall to the bottom thereof where they will be returned through the return pipe 15 to the pipe 16 communicating with the interior of the kettle still. This first distillation under the separator temperature control of 166 degrees Fahrenheit, above mentioned, permits only acetaldehyde and acetic ether vapors to pass into the refining column, therefore the ethyl alcohol and other products which vaporize at a higher temperature, will be carried through a constant process of vaporization, condensation, and return from the fractional separator to the kettle still, until all of the acetaldehyde and acetic ether vapors have been driven off into the refining column. The vapors at 166 degrees Fahrenheit now pass through elbow 30 and ascend through the column by first being submerged in the water baths, where some portions of the vapors, such as the oily constituents thereof, that are being made less volatile by this action, are retained by coming into contact with the water baths, the temperature of which is slightly under the temperature of the vapors of 166 degrees Fahrenheit, that are passing through and keeping the water at a uniform temperature in this manner. The substance that is retained by the water on the drip pans 32, accumulates and flows through the overflow pipes 35 into the bottom chamber 31, whence they are returned to the kettle still 4 by the pipes 46, 15 and 16. The vapors having ascended through the column now pass through the pipe 10 and enter the final separator 9. In passing through this separator some of the vapors that are made weak by passing through the refining column 7, are condensed in the final separator and flow out of the opening 39, into return pipe 40, thence into the refining column 7 through the refining column and back to the kettle still 4 by means of the pipes 46, 15 and 16. The vapors that remain uncondensed after passing through the final separator 9, enter vapor pipe 11ª, pass into condenser 11 in which they descend and are condensed and drop into the bottom chamber 49 of the condenser, from which they are conducted into the tale box 47 through which they are run off into condensers. After this first distillation under the above mentioned temperature control of 166 degrees Fahrenheit has been accomplished, as determined by the alcoholometer located therein, the temperature of the vapors arising in the kettle still 4, is raised to 190 degrees Fahrenheit. This temperature will be indicated by the thermometer 44 on the vapor pipe 6 connecting the kettle still with the fractional separator 5. At the same time that the temperature is raised in the kettle still, the temperature of the water passing through the fractional separator 5 is raised from 166 degrees to 175 degrees Fahrenheit. This raise in temperature of the water passing through the fractional separator 5, is accomplished by admitting less water to the separator so that there is less water to flow through the separator for the increased temperature of the gases passing from the kettle still. This increased controlling temperature of the water passing through the fractional separator, permits of the free passage of only the ethyl alcohol vapors now produced in the still, through the fractional separator, the refining column 7, final fractional separator 9, condenser 11, and tale box 47. These vapors are now free from the contaminating products previously distilled during the first temperature control of the fractional separator, as well as the less volatile vapors of products which are vaporized at a higher temperature and which are constantly being returned from the fractional separator to the kettle through the return pipes 15 and 16. Although the acetaldehyde and ethyl alcohol are extraordinarily miscible it will be seen that separation is easily accomplished by the separating action of the fractional separator under proper temperature control as above described. The constant return to the kettle, of the products which are vaporized at a higher temperature, causes the production of an ethyl alcohol or neutral spirit of exceptional purity and high proof. The proof tests of alcohol produced by my apparatus will run from 192 to 194 if required.

By thus continuing the distillation of the contents of the kettle and by returning the condensed products from the fractional separator when it is under a temperature control of 175 degrees Fahrenheit, the entire ethyl alcohol or ethyl spirit content of the material in the kettle is removed so that there remain the less volatile oils, alcohols or other products. This remaining material comprises the propyl, butyl, and amyl bodies, whose vaporizing temperatures are much higher than the temperature of the water controlling the condensation of the products passing through the fractional separator, therefore these products will remain in the kettle after the period of distillation has been completed. These products remaining in the kettle after distillation, are now run off through the pipe 16 and valve 42 to be used in the amyl alcohol or fusel oil production. It will thus be seen that not only the ethyl alcohol product is much larger and of greater purity than ethyl alcohol heretofore produced, but that the amyl alcohol or fusel oil produced from the remaining contents of the kettle is correspondingly of larger quantity and greater purity than these products have been heretofore.

To sum up the functions performed by my apparatus, I may say that it removes from what is known as commercial high wines, such contaminating bodies as vaporize at a lower temperature and at a higher temperature than that of ethyl alcohol or neutral spirit and that the ethyl alcohol or spirits may be recovered without loss and without contamination through one continuous period of distillation, in quantities and at a proof and purity which are greater than has been heretofore commercially possible.

Having thus described my invention what I claim is:

1. In a distilling apparatus, the combination of a kettle still, a fractional separator, gas pipes connecting the kettle still and said separator, return pipes leading from said separator to the kettle still, a refining column, gas pipes leading from the fractional separator into said column, return pipes leading from said column into the kettle still, and means for maintaining the column at a higher temperature than the fractional separator.

2. In a distilling apparatus, the combination of a kettle still, a fractional separator, gas pipes connecting the kettle still and said separator, return pipes leading from said separator to the kettle still, a refining column, gas pipes leading from the fractional separator into said column, return pipes leading from said column into the kettle still, and a water cooling system for the fractional separator and for the column, adapted to maintain the column at a higher temperature than the fractional separator.

3. In a distilling apparatus, the combination of a kettle still, a fractional separator, gas pipes connecting the kettle still and said separator, return pipes leading from said separator to the kettle still, a refining column, gas pipes leading from the fractional separator into said column, return pipes leading from said column into the kettle still, means for maintaining the column at a higher temperature than the fractional separator, a condenser, gas pipes connecting the condenser and the refining column, and return pipes leading from the condenser back into the column.

In testimony whereof, I have hereunto subscribed my name this 8th day of June, 1914.

JACOB BUCHERT.

Witnesses:
WALTER F. MURRAY,
W. THORNTON BOGERT.